(12) United States Patent
Uchida

(10) Patent No.: US 7,447,145 B2
(45) Date of Patent: Nov. 4, 2008

(54) DATA COMMUNICATION DEVICE SELECTING MODULATION METHOD WITH AN APPROPRIATE THRESHOLD VALUE IN ADAPTIVE MODULATION

(75) Inventor: Masaya Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 452 days.

(21) Appl. No.: 10/545,071

(22) PCT Filed: May 26, 2004

(86) PCT No.: PCT/JP2004/007190

§ 371 (c)(1),
(2), (4) Date: Aug. 9, 2005

(87) PCT Pub. No.: WO2004/107695

PCT Pub. Date: Dec. 9, 2004

(65) Prior Publication Data

US 2006/0129567 A1 Jun. 15, 2006

(30) Foreign Application Priority Data

May 27, 2003 (JP) ............................... 2003-149114

(51) Int. Cl.
*H04J 9/00* (2006.01)
(52) U.S. Cl. ...................... 370/204; 370/212; 370/213; 370/215
(58) Field of Classification Search ................. 370/465, 370/204, 212, 213, 215; 707/100
See application file for complete search history.

(56) References Cited

U.S. PATENT DOCUMENTS 6,452,964 B1 * 9/2002 Yoshida ...................... 375/222

6,823,005 B1 * 11/2004 Chuang et al. ............... 375/227
6,965,639 B2 * 11/2005 Uesugi ........................ 375/225
7,127,256 B2 * 10/2006 Terry et al. ................ 455/452.2
7,130,587 B2 * 10/2006 Hikokubo et al. ......... 455/67.11

(Continued)

FOREIGN PATENT DOCUMENTS

| EP | 0903883 A2 * | 3/1999 |
| EP | 1 227 603 A1 | 7/2002 |
| EP | 1 259 015 A3 | 7/2003 |
| EP | 0 903 883 A3 | 8/2005 |
| GB | 2 391 431 A | 7/2002 |

(Continued)

OTHER PUBLICATIONS

Motorola; "Adaptive Modulation and Coding(AMC)"; 2000; TSGR1#17(00)1395; pp. 1-7.*

(Continued)

*Primary Examiner*—Ricky Ngo
*Assistant Examiner*—Dewanda Samuel
(74) *Attorney, Agent, or Firm*—McGinn IP Law Group, PLLC

(57) ABSTRACT

There is provided a digital communication device for performing data communication by selecting an appropriate modulation encoding method. Quality measurement means measures the line quality of data communication from a reception signal. Adaptive modulation control means compares the line quality measured by the quality measurement means to a threshold value obtained from the interrelationship between the line quality in a plurality of modulation encoding methods and the through-put characteristic, thereby selecting one of the modulation encoding methods. Here, the adaptive modulation control means uses as the threshold value a value of the line quality at the intersection of two curves indicating the aforementioned characteristic under a condition having no disturbance among the plurality of modulation encoding methods.

27 Claims, 6 Drawing Sheets

U.S. PATENT DOCUMENTS

| | | | |
|---|---|---|---|
| 7,218,692 B2 * | 5/2007 | Dabak et al. | 375/346 |
| 2002/0072885 A1 * | 6/2002 | Tang | 703/3 |
| 2002/0099529 A1 | 7/2002 | Tang | |
| 2003/0063587 A1 * | 4/2003 | Cho et al. | 370/335 |
| 2003/0100267 A1 * | 5/2003 | Itoh et al. | 455/69 |
| 2004/0076172 A1 * | 4/2004 | Sano | 370/442 |
| 2004/0100911 A1 * | 5/2004 | Kwan et al. | 370/252 |

FOREIGN PATENT DOCUMENTS

| | | |
|---|---|---|
| JP | 9-135274 | 5/1997 |
| JP | 10-56420 | 2/1998 |
| JP | 11-164373 | 6/1999 |
| JP | 2001-36483 | 2/2001 |
| JP | 2002-64424 | 2/2002 |
| JP | 2002-199033 | 7/2002 |
| JP | 2002-527938 | 8/2002 |
| JP | 2002-320262 | 10/2002 |
| JP | 2003-37554 | 2/2003 |
| JP | 2003-78452 | 3/2003 |
| JP | 2004-23145 | 1/2004 |
| JP | 2004-64797 | 2/2004 |
| WO | WO 02/25856 A2 | 3/2002 |

OTHER PUBLICATIONS

Yang et al.; "Adative Modulation and Coding in 3G Wireless Systems";2002; University of Waterloo Coding & Signaling Laboratory Department of Electrical & Computer Engineering; Technical Report UW-E&CE#2002-15; pp. 1-18.*

Keller et al; "Adaptive Multicarrier Modulation: A Convientent Framework for Time-Frequency Processing in Wireless Communications";200; IEEE; pp. 611-637.*

3rd Generation Partnership Project; Technical Specification Group Radio Access Network; Physical layer aspects of UTRA High Speed Downlink Packet Access (Release 4), 3GPP TR 25.848 V4.0.0(Mar. 2001).

United Kingdom dated Nov. 30, 2005.

United Kingdom Office Action dated Jan. 15, 2008.

Yang, James, "Adaptive Modulation and Coding in 3G Wireless Systems", Proceedings of the Vehicular Technology Conference, IEEE, 2002 vol. 1, pp. 544-548, 2002.

Yang, James "Statistical Decision Making in Adaptive Modulation and Coding for 3G Wireless Systems", HTTP://Shannon2.uwaterloo.ca/~k 1/t/James_Yang.pdf, 2002, p. 19-20.

* cited by examiner

DATA COMMUNICATION DEVICE SELECTING MODULATION METHOD WITH AN APPROPRIATE THRESHOLD VALUE IN ADAPTIVE MODULATION

TECHNICAL FIELD

The present invention relates to a digital radio communication apparatus which employs an adaptive modulation process.

BACKGROUND ART

In recent years, mobile communications have remarkably been in wide use and progress, and there are great expectations for mobile communications. The 3GPP has laid down new standards for the purposes of providing multimedia- and Internet-conscious systems, supporting data communications at high data rates, and establishing global common standards.

Radio communication standards of the 3GPP employ the AMC (Adaptive Modulation and Coding) technology for efficient data transmission.

According to AMC, dynamic changes in the line quality are adaptively addressed to effectively utilize radio channel resources for efficient data transmission. A data reception device measures the line quality and selects a modulation process and an encoding ratio for use in data transmission, i.e., an MCS (Modulation Coding Scheme), based on the measured line quality, and sends the MCS to a data transmission device. The data transmission device transmits data using the MCS.

At present, various studies are being made as to methods for appropriately selecting an MCS (see, for example, Japanese laid-open patent publication No. 2002-199033, Japanese laid-open patent publication No. 2002-320262, and PC(WO) No. 2002-527938.

DISCLOSURE OF THE INVENTION

Though various studies are being made, no methods for appropriately selecting an MCS have been established so far. Consequently, there could be situations where a suitable MCS that is supposed to be selected is not selected. Furthermore, according to the 3GPP standards, no specific control process is prescribed for an MCS, and leeway is given as to how to realize an MCS.

It is an object of the present invention to provide an adaptive modulation digital communication apparatus which is capable of appropriately selecting an MCS.

To achieve the above object, a data communication apparatus according to the present invention a data communication apparatus for adaptively selecting one of a plurality of modulation encoding processes for use in data communications. The data communication apparatus has a quality measuring means and an adaptive modulation control means.

The quality measuring means measures the line quality of data communications from a reception signal. The adaptive modulation control means selects either one of the modulation encoding processes by comparing the line quality measured by the quality measuring means with a threshold which is determined from mutual relationship of the characteristics of throughputs to the line qualities according to the modulation encoding processes.

The adaptive modulation control means may use, as the threshold, the value of the circuit quality at the crossing of curves representative of the characteristics under disturbance-free conditions of two of the modulation encoding processes.

The adaptive modulation control means may dynamically control the threshold to converge the throughput of data in a predetermined quality width from the threshold, transmitted by a modulation encoding process which is higher than a present threshold, to the maximum throughput according to a modulation encoding process which is lower than the present threshold.

BEST MODE FOR CARRYING OUT THE INVENTION

An embodiment of the present invention will be described in detail below with reference to the drawings.

Figure 1:
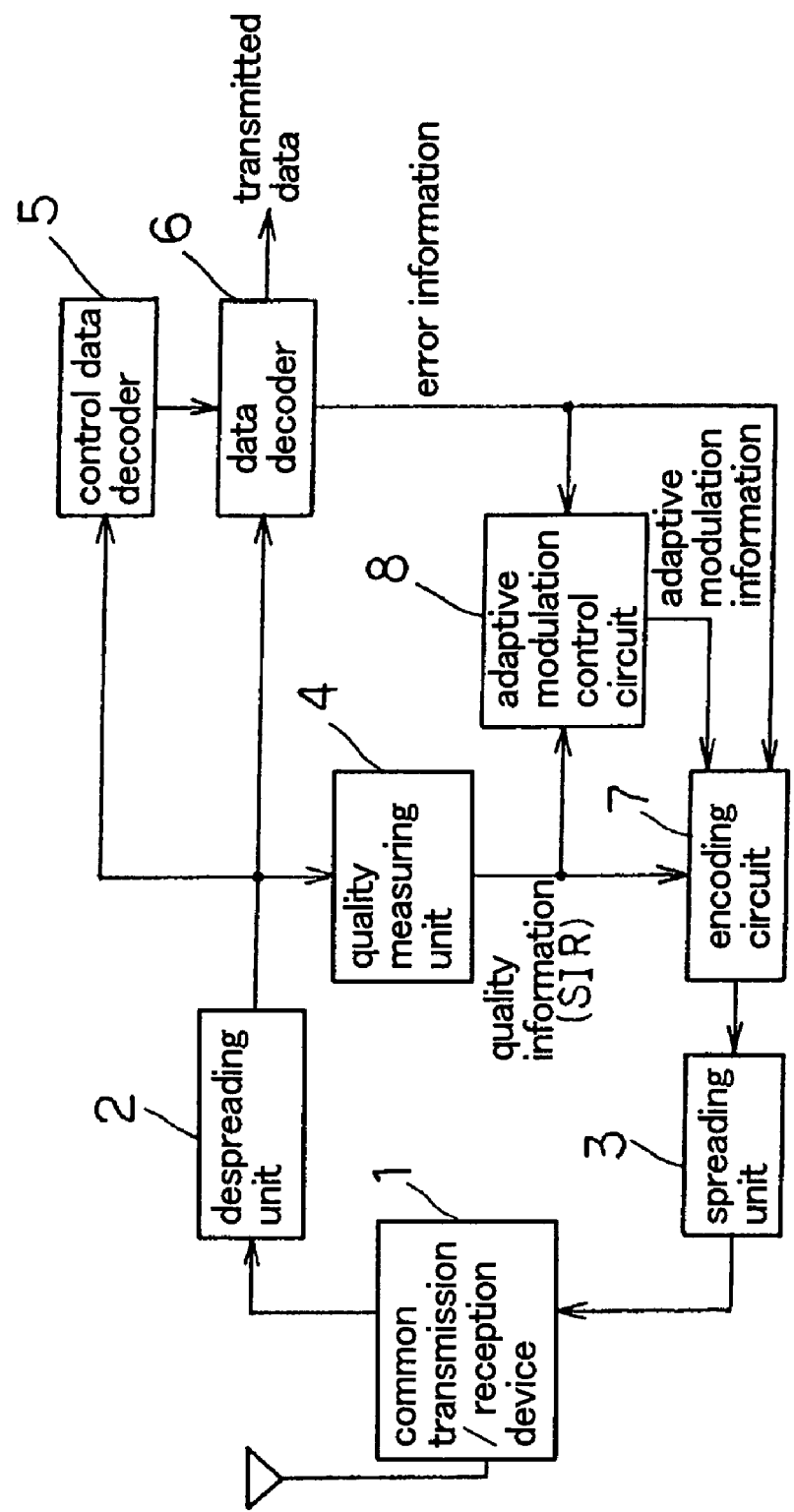
[FIG. 1] is a block diagram showing an arrangement of a data reception apparatus according to an embodiment of the present invention.

FIG. 1 is a block diagram showing an arrangement of a data reception apparatus according to an embodiment of the present invention. The data reception apparatus receives data transmitted from a data transmission apparatus, not shown. At this time, the data reception apparatus measures the line quality, selects a modulation process and an encoding ratio, i.e., an MCS (Modulation Coding Scheme), based on the measured line quality, and sends the MCS to the data transmission apparatus. The data transmission apparatus encodes, spreads, and transmits data using the MCS sent from the data reception apparatus.

As shown in FIG. 1, the data reception apparatus has common transmission/reception device 1, despreading unit 2, spreading unit 3, quality measuring unit 4, control data decoder 5, data decoder 6, encoding circuit 7, and adaptive modulation control circuit 8.

Common transmission/reception device 1 transmits and receives signals with radio waves using an antenna.

Despreading unit 2 despreads a signal received by common transmission/reception device 1, and sends the despread signal to quality measuring unit 4, control data decoder 5, and data decoder 6.

Quality measuring unit 4 measures the line quality of a data channel of the received signal which has been despread, and sends the measured line quality as quality information to encoding circuit 7 and adaptive modulation control circuit 8. The line quality represents an SIR (Signal power to Interference power Ratio), for example.

Control data decoder 5 decodes MCS information representative of an MCS used by a data transmission device, and sends the MCS information to data decoder 6.

Data decoder 6 decodes data according to the MCS information sent from control data decoder 5. Data decoder 6 detects an error of the data and sends the detected error as error information to encoding circuit 7 and adaptive modulation control circuit 8.

Adaptive modulation control circuit 8 selects an optimum MCS based on the quality information from quality measuring unit 4 and the error information from data decoder 6, and sends the selected MCS as adaptive modulation information to encoding circuit 7.

Encoding circuit 7 encodes the quality information from quality measuring unit 4, the error information from data decoder 6, and the adaptive modulation information from adaptive modulation control circuit 8, and sends the encoded information as a transmission signal to spreading unit 3.

Spreading unit 3 spreads the transmission signal from encoding circuit 7, and sends the spread transmission signal to common transmission/reception device 1.

Figure 2:
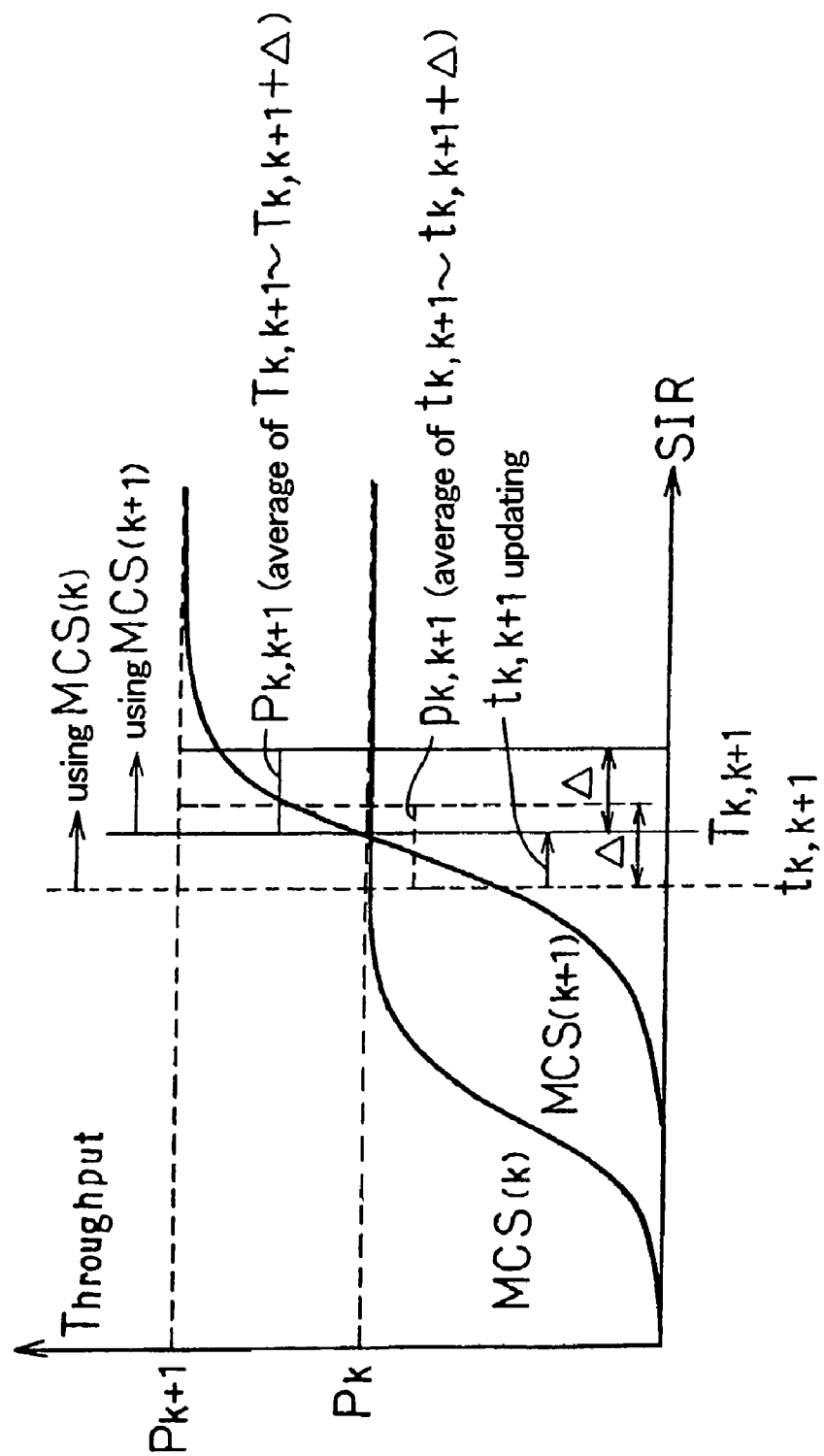
[FIG. 2] is a graph showing by way of example static characteristics of the throughput of each MCS with respect to SIR according to the embodiment.

FIG. 2 is a graph showing by way of example static characteristics of the throughput of each MCS with respect to SIR according to the embodiment. The static characteristics refer to the relationship between SIR and throughputs in a state free of disturbances such as multipath and fading. The static characteristics are obtained by measurements and simulations under conditions free of multipath and fading. FIG. 2 shows curves representing static characteristics of two adjacent MICs (MCS(k) and MCS(k+1)). In FIG. 2, k, k+1 indicate the numbers of MICs. $T_{k,k+1}$ represents a threshold determined from the static characteristics, and $t_{k,k+1}$ represents a present threshold. $B_{k,k+1}$ represents a target error rate in the vicinity of threshold $T_{k,k+1}$, and $b_{k,k+1}$ represents a block error rate in the vicinity of the threshold $t_{k,k+1}$. $P_k$ represents a maximum throughput of the MCS(k). $P_{k,k+1}$ represents an average throughput in the vicinity of threshold $T_{k,k+1}$, and $P_{k,k+1}$ represents an average throughput in the vicinity of threshold $t_{k,k+1}$.

Generally, if the number of values transmitted by a modulation process is greater, then the throughput (maximum throughput) under ideal conditions (SIR=∞) of an MCS is higher, but the throughput at a lower SIR suffers a greater reduction. If the number of values transmitted by a modulation process is smaller, then the throughput under ideal conditions is lower, but the reduction in the throughput at a lower SIR is smaller than if the number of values transmitted by a modulation process is greater.

Similarly, if the encoding ratio is higher, the throughput under ideal conditions (SIR=∞) is higher, but the throughput at a lower SIR suffers a greater reduction. If the encoding ratio is lower, the throughput under ideal conditions is lower, but the reduction in the throughput at a lower SIR is relatively small.

Therefore, the two curves of the two MCSs having different throughputs with respect to the SIR cross each other as shown in FIG. 2. Consequently, the MCSs may be switched one from the other at the crossing in order for the data reception device to have an optimum throughput. Specifically, when the SIR is smaller than SIR value $T_{k,k+1}$ at the crossing, the MCS(k) is selected, and when the SIR is greater than SIR value $T_{k,k+1}$ at the crossing, the MCS(k+1) is selected, thereby maintaining a maximum throughput. To this end, the crossing between the two curves of the MCS(k) and the MCS(k+1) may be determined, and the SIR value at the crossing may be used as a threshold for selecting one of the MCSs.

If the control of AMC is capable of keeping up with fading with sufficient accuracy, the switching between MCSs is accurately performed by the threshold according to the SIR of each packet, and the interference component can be regarded as white Gaussian noise, then providing that the SIR in an evaluated small unit such as each slot (or packet) can be regarded as being constant even in the presence of multipath or fading, the throughput characteristics in each small unit are in conformity with the static characteristics. This provides ideal conditions for AMC control, and if the SIR at the crossing of the static characteristic curves of the respective MCSs is determined as a threshold in advance, then the throughput of data communications can easily be kept at an optimum level by the fixed threshold.

Heretofore, there have been instances where a threshold is established based on throughput characteristics (dynamic throughput characteristics) according to an SIR obtained by averaging fading-based variations over a long period of time rather than for each small unit. Essentially, however, it Is necessary to establish a threshold according to static characteristics, as described above.

Static throughput characteristics actually measured in the apparatus may shift from ideal static characteristics for various reasons, e.g., the saturation of the measured value of an SIR due to interference components such as multipath and fading and the failure of the control of AMC to keep up with fading with sufficient accuracy due to rounding errors of bit calculations. In such a case, the throughput of data communications cannot be kept at an optimum level by a threshold that is obtained in advance based on ideal static characteristics.

If present threshold t is greater than an optimum threshold T, then data which are supposed to be transmitted by a higher MCS (MCS(k+1) in FIG. 2) are transmitted by a lower MCS (MCS(k) in FIG. 2), with the result that an optimum throughput cannot be achieved.

Conversely, if present threshold t is smaller than optimum threshold T, then data which are supposed to be transmitted by the lower MCS are transmitted by the higher MCS, with the result that an optimum throughput cannot be achieved and an error rate worsens.

In those cases, the threshold may be dynamically controlled into an optimum threshold. Using a threshold that is obtained in advance based on static characteristics as an initial value is effective because the threshold can be converged in a short period of time.

As can be seen from FIG. 2, generally, the static throughput characteristics of the respective MCSs rise sharply in the vicinity of a certain SCR and are saturated at a certain maximum value. In the vicinity of the crossing of the two curves, the throughput of the lower MCS (MCS(k) in FIG. 2) reaches a substantially maximum value (Pk in FIG. 2) and is saturated.

Therefore, even if the throughput of the higher MCS (MCS (k+1) in FIG. 2) is shifted, the throughput at the crossing can be regarded as being constant as the maximum throughput (Pk in FIG. 2) of the lower MCS.

The block error rate $B_{k,k+1}$ of the higher MCS at the crossing is expressed by the following equation (1):

$$B_{k,k+1}=(P_{k+1}-P_k)/P_{k+1}=\text{constant} \qquad (1)$$

where $P_k$: the maximum throughput of MCS(k); and
$P_{k+1}$: the maximum throughput of MCS(k+1).

The block error rate $B_{k,k+1}$ is a block error rate (target error rate) at the optimum threshold, and has a constant value determined by the maximum throughputs $P_k$, $P_{k+1}$ of the two MCSs. Even if the throughput characteristics are shifted, the throughput of data communications can be kept at an optimum level by dynamically controlling the threshold to equalize the block error rate to the target error rate.

For optimally controlling the threshold if the throughput characteristics are shifted, the block error rate may be measured in the vicinity of the present threshold, and the threshold may be corrected based on the measured block rate such that the block error rate at the threshold will be an optimum error rate.

Figure 3:
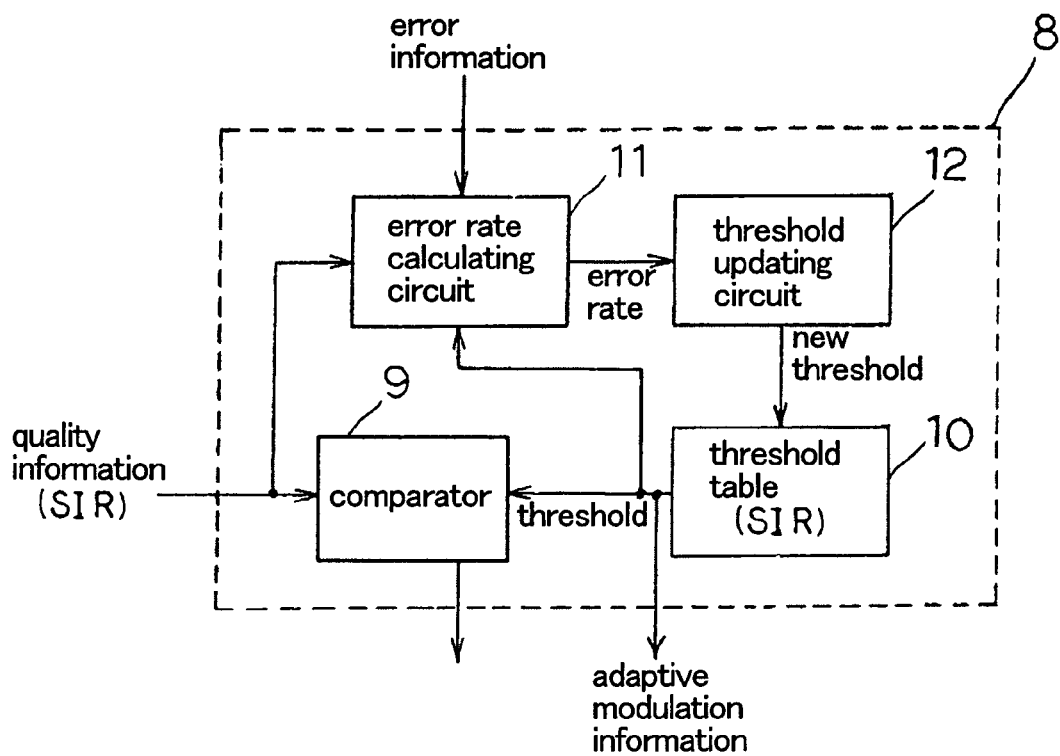
[FIG. 3] is a block diagram showing an arrangement of an adaptive modulation control circuit.

FIG. 3 is a block diagram showing an arrangement of the adaptive modulation control circuit. As shown in FIG. 3, adaptive modulation control circuit 8 has comparator 9, threshold table 10, error rate calculating circuit 11, and threshold updating circuit 12.

Error rate calculating circuit 11 calculates a block error rate when the SIR is in the vicinity of the threshold, using the error information from data decoder 6, the quality information from quality measuring unit 4, and a threshold set in threshold table 10. If there are three or more MCSs, then two or more thresholds are used, and error rate calculating circuit 11 calculates a block error rate in the vicinity of each of the thresholds. The block error rate calculated by error rate calculating circuit 11 is supplied to threshold updating circuit 12.

Threshold updating circuit 12 determines a new threshold using the block error rate calculated by error rate calculating circuit 11, and updates threshold table 10 with the new threshold. At this time, threshold updating circuit 12 determines a new threshold such that the block error rate at the threshold will be the target error rate.

Threshold table 10 stores thresholds and supplies information as to the thresholds to error rate calculating circuit 11. The information as to the thresholds is also supplied as part of adaptive modulation information to encoding circuit 7.

Comparator 9 compares the thresholds supplied from threshold table 10 with the quality information, selects an MCS to be used for data transmission, and sends the selected MCS as the adaptive modulation information to encoding circuit 7.

A process of controlling a threshold in adaptive modulation control circuit 8 will specifically be described below with reference to FIG. 2.

It is assumed that data decoder 6 indicates an error of each packet to adaptive modulation control circuit 8. Error information for indicating such errors includes information as to whether there are errors with respect to all packets or not and information as to MCSs.

First, a counting area ($t_{k,k+1}<SIR<t_{k,k+1}+\Delta$) having a predetermined quality width $\Delta$ is set on the right side of present threshold $t_{k,k+1}$. $\Delta$ represents a parameter that can be set to any value. Parameter A is set depending on the system so that the number of packets received in the counting area becomes a number of samples which are suitable for calculating an error rate when the error rate varies due to fading or the like.

Error rate calculating circuit 11 calculates in each given time a block error rate of packets according to the higher MCS (MCS(k+1) in FIG. 2) which are received in the counting area due to fading or the like. The given time is a parameter that can be set to any value. As with parameter $\Delta$, this time is set depending on the system so that a suitable of samples will be obtained and the selection of an MCS will be changed with a sufficient frequency.

More specifically, error rate calculating circuit 11 counts all packets and error packets according to the higher MCS from the error information indicated by data decoder 6 while the SIR of the quality information from quality measuring unit 4 is in the counting area, and puts the counted numbers into the equation (2) to determine a block error rate in the vicinity of the present threshold.

$$b_{k,k+1}=M_{k,k+1}/N_{k,k+1} \quad (2)$$

where $b_{k,k+1}$: the block error rate in the vicinity of present threshold $t_{k,k+1}$;

$M_{k,k+1}$: the number of error packets in the vicinity of present threshold $t_{k,k+1}$; and $N_{k,k+1}$: the number of all packets in the vicinity of present threshold $t_{k,k+1}$.

If the equation (1) is rewritten to represent a block error rate (target error rate) in the width $\Delta$ area in the vicinity of the optimum threshold, rather than the block error rate at the crossing (optimum threshold), then the equation (3) is obtained.

$$B_{k,k+1}=(P_{k+1}-P_{k,k+1})/P_{k+1}=\text{substantially constant} \quad (3)$$

where $P_{k,k+1}$: the average throughput in the vicinity of the optimum threshold $T_{k,k+1}$.

The value obtained according to the equation (3) is slightly greater than the value obtained according to the equation (1).

In order to control the threshold for converging the block error rate in the vicinity of the present threshold obtained according to the equation (2) to the target error rate obtained according to the equation (3), a new threshold is of a value indicated by the equation (4).

$$t'_{k,k+1}=t_{k,k+1}+c(b_{k,k+1}-B_{k,k+1}) \quad (4)$$

where $t'_{k,k+1}$: the new threshold;

$t_{k,k+1}$: the present threshold; and c: a coefficient for converging the threshold (converging coefficient)>0.

The equation (4) determines a new threshold by adding a value produced by multiplying the difference between the block error rate in the vicinity of the present threshold and the target error rate by the converging coefficient, to the present threshold. That is, a block error rate is determined at predetermined time intervals, and converging the threshold to the target value by increasing the threshold if the block error rate is greater than the target error rate and reducing the threshold if the block error rate is smaller than the target error rate.

According to the present embodiment, quality measuring unit 4 measures the line quality, and adaptive modulation control circuit 8 selects an MCS by comparing the line quality with a threshold obtained based on the static characteristics of the throughputs at the higher and lower MCSs. Therefore, it is possible to select an optimum MCS for obtaining the maximum throughput at the present liquid quality for efficiently transmitting data.

According to the present embodiment, furthermore, in the communication system for switching between MCSs depending on the threshold for the line quality and using a selected MCS for data transmission, error rate calculating circuit 11 measures a block error rate of data transmitted according a higher MCS at the present threshold in the vicinity of the present threshold, and threshold updating circuit 12 controls the threshold in order to converge the block error rate in the vicinity of the present threshold to the target error rate obtained from the static characteristics of the higher and lower MCSs, and comparator 6 selects an MCS according to the threshold controlled by threshold updating circuit 12. Therefore, even if the throughput of each MCS is shifted from the static characteristics due to multipath or fading, it is possible to select an optimum MCS for obtaining a maximum throughput at all times for efficiently transmitting data, based on the fact that the throughput at the threshold does not change from the saturated maximum throughput according to the lower MCS.

According to the present embodiment, a shift of the throughput characteristics due to disturbances is canceled out by dynamically controlling the threshold, making it possible to select an optimum MCS for keeping the throughput of data communications at an optimum level. However, the present invention is not limited to such an example.

For example, if a shift of the throughput characteristics due to disturbances is sufficiently small, then it is not necessary to dynamically control the threshold, and the data reception device may be simplified in arrangement.

Figure 4:
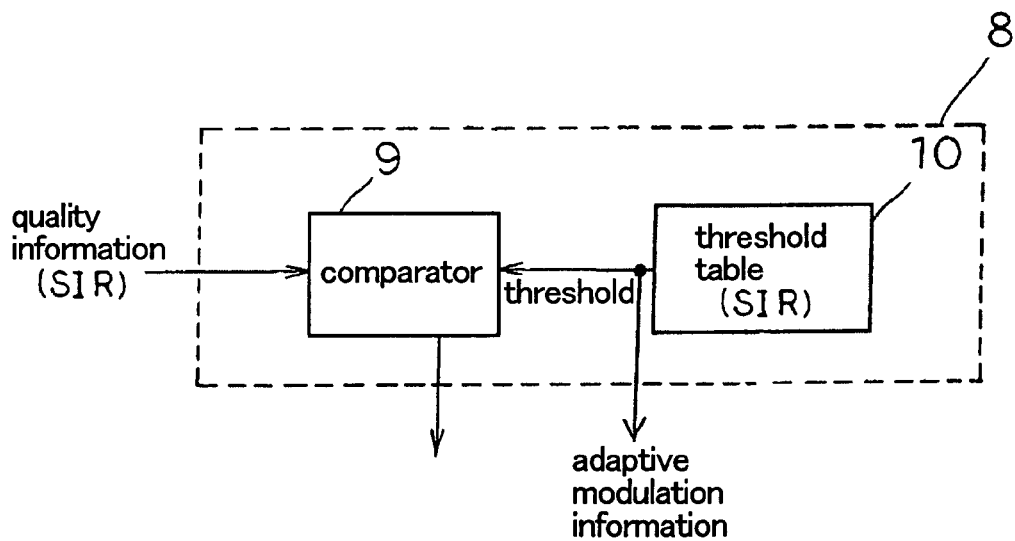
[FIG. 4] is a block diagram showing another arrangement of an adaptive modulation control circuit.

FIG. 4 is a block diagram showing another arrangement of an adaptive modulation control circuit. As shown in FIG. 4, the adaptive modulation control circuit has comparator 9 and threshold table 10.

Comparator 9 and threshold table 10 are identical to those illustrated in FIG. 3. In threshold table 10, there are recorded thresholds determined from the crossing of the curves of static throughput characteristics according to MCSs. The thresholds set in threshold table 10 are not dynamically controlled. Information as to the thresholds may be given as part of the adaptive modulation information to encoding circuit 7.

According to the present embodiment, the data reception device does not perform rake combination for the sake of brevity. However, the present invention is applicable to a data reception device which performs rake combination. Multipath could be largely responsible for shifting the throughput characteristics. Since the data reception device can improve and stabilize an SIR by reducing multipath through rake combination, a shift of the throughput characteristics is reduced as a result.

Figure 5:
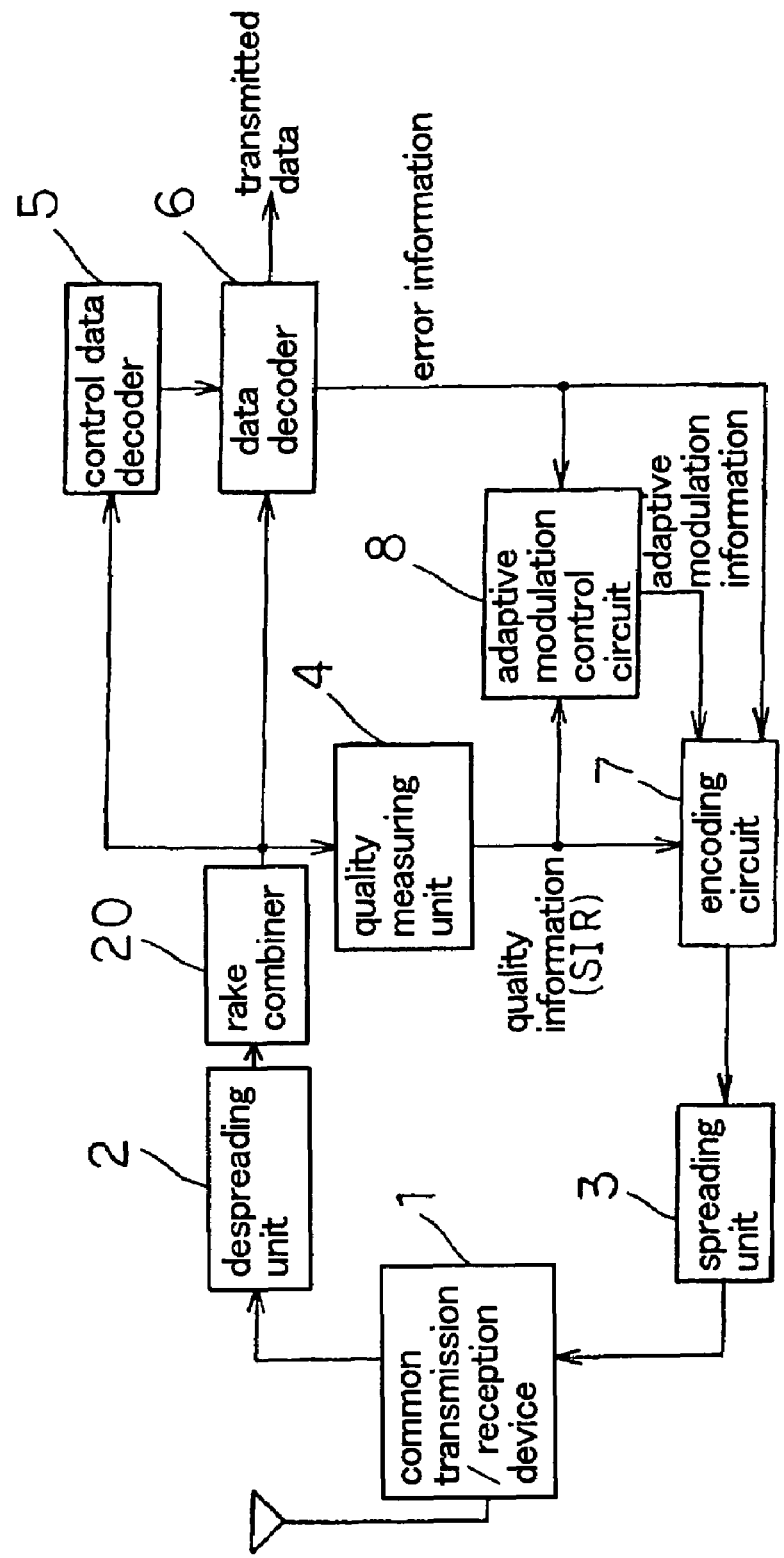
[FIG. 5] is a block diagram showing an arrangement of a data reception apparatus for performing rake combination, to which the present invention is applied.

FIG. 5 is a block diagram showing an arrangement of a data reception apparatus for performing rake combination, to which the present invention is applied. As shown in FIG. 5, the data reception apparatus has common transmission/reception device 1, despreading unit 2, spreading unit 3, quality measuring unit 4, control data decoder 5, data decoder 6, encoding circuit 7, adaptive modulation control circuit 8, and rake combiner 20.

Common transmission/reception device 1, despreading unit 2, spreading unit 3, quality measuring unit 4, control data decoder 5, data decoder 6, encoding circuit 7, and adaptive modulation control circuit 8 are identical to those shown in FIG. 1. Rake combiner 20 combines a plurality of multipath signals.

A shift can also be reduced by using an MPIC (multipath interference canceler) instead of rake combiner 20. In this case, rake combiner 20 shown in FIG. 5 is replaced with a multipath interference canceler.

In data communications, there are instances where an upper limit is posed on error rates on account of resending conditions. Even if a maximum throughput is obtained by selecting an MCS, it is not preferable to allow an error rate in excess of an upper limit that is determined for data communications. In such a case, the target error rate may be lowered into a range which does not exceed the upper limit for error rates. By lowering the target error rate, i.e., by increasing the SIR of the threshold, the error rate does not exceed the upper limit though the throughput of data communications is somewhat reduced.

According to the present embodiment, the static characteristics for the SIR according to each MCS may be determined by a simulation using a pseudo signal.

Figure 6:
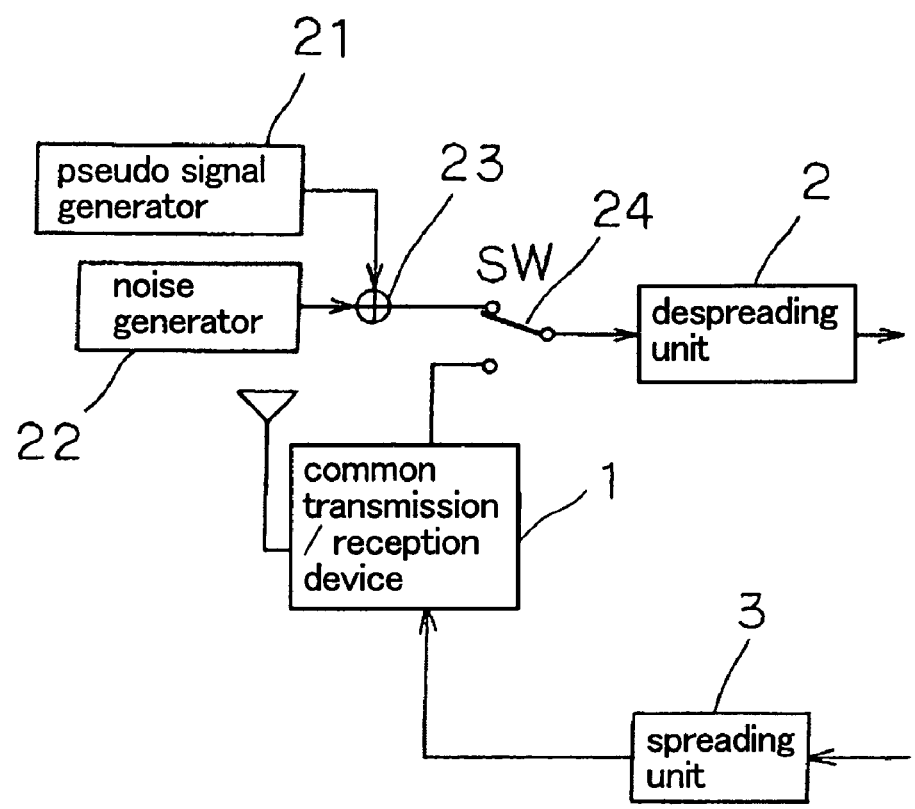
[FIG. 6] is a block diagram showing an arrangement of a data reception apparatus for determining static characteristics based on a simulation using a pseudo signal.

FIG. 6 is a block diagram showing an arrangement of a data reception apparatus for determining static characteristics based on a simulation using a pseudo signal. FIG. 6 shows only common transmission/reception device 1, despreading unit 2, spreading unit 3, and nearby components. Other components are omitted from illustration and are identical to those shown in FIG. 1.

The data reception device shown in FIG. 6 has pseudo signal generator 21, noise generator 22, adder 23, and switch 24 in addition to those shown in FIG. 1.

Switch 24 connects common transmission/reception device 1 to despreading unit 2 when in normal operation. For determining a threshold in the static characteristics environment, switch 24 connects an output terminal of adder 23 to despreading unit 2. Pseudo signal generator 21 generates a signal similar to a desired wave signal. Noise generator 22 generates white Gaussian noise similar to an interference component. Adder 23 adds the signal from pseudo signal generator 21 and the white Gaussian noise from noise generator 22 to each other. The ratio of the pseudo desired wave signal generated by pseudo signal generator 21 and the white Gaussian noise from noise generator 22 is adjusted to obtain a desired SIR.

With the arrangement shown in FIG. 6, for determining a threshold in the static characteristics environment, pseudo signal generator 21 and noise generator 22 produce a pseudo reception signal in a state free of multipath and fading, and adaptive modulation control circuit 8 determines a threshold according to the pseudo reception signal. Therefore, there is determined a threshold in the static characteristics environment which is free of effects of multipath and fading, contains disturbances depending on the data reception device, and is closer to the actual environment.

According to the present embodiment, error calculating circuit 11 calculates an error rate, and threshold updating circuit 12 determines a new threshold. However, the present invention is not limited to such an arrangement. For example, the calculation of an error rate and the calculation of a threshold may be integrally combined with each other.

Figure 7:
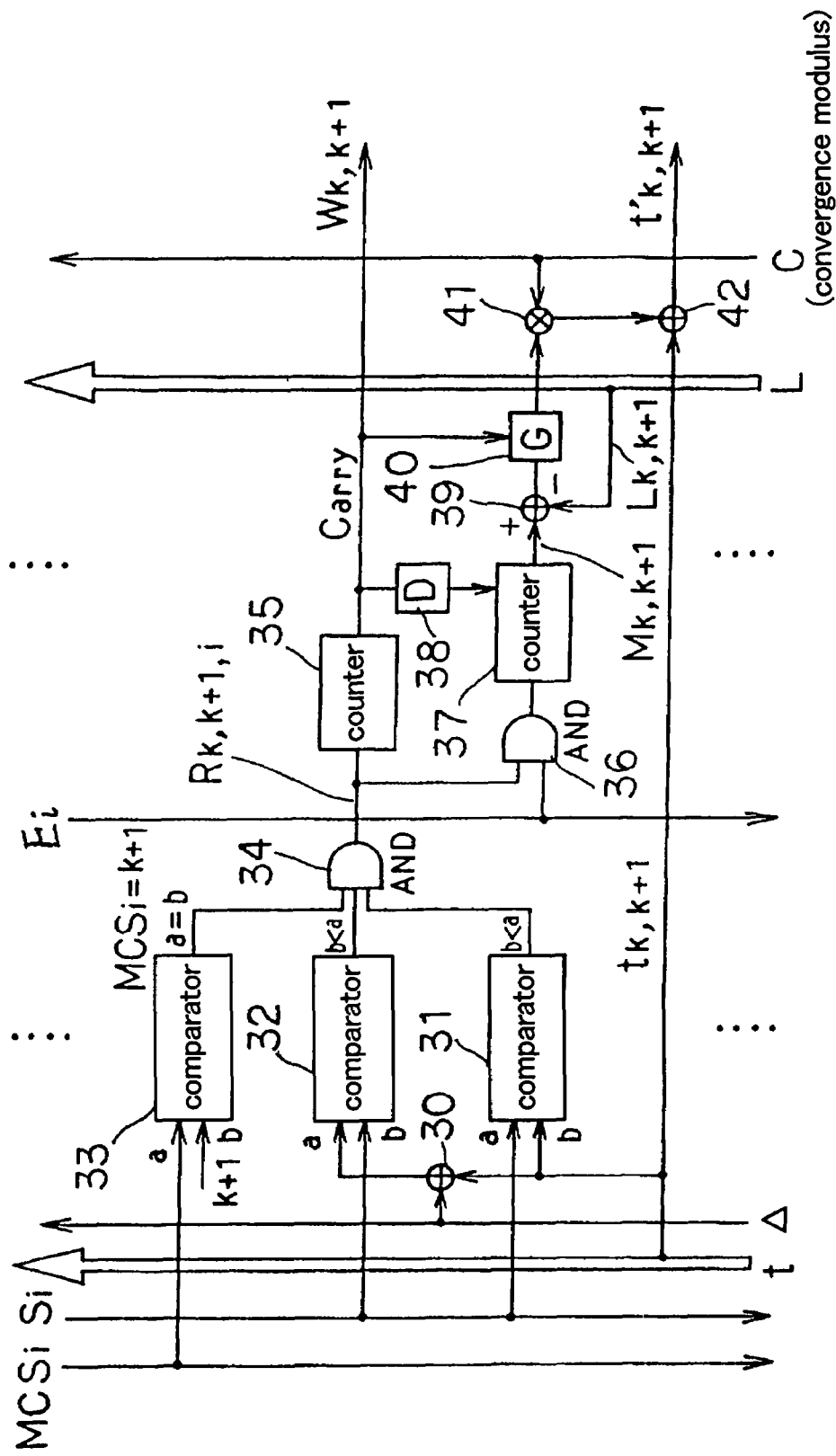
[FIG. 7] is a block diagram showing an arrangement of a threshold updating circuit for calculating an error rate and updating a threshold.

FIG. 7 is a block diagram showing an arrangement of a threshold updating circuit for calculating an error rate and updating a threshold. Actually, there are as many thresholds as (the number of MCSs−1) and all of them are dynamically controlled. However, only a threshold between MCS(k) and MCS(k+1) will be described below.

As shown in FIG. 7, the threshold updating circuit has adders 30, 42, comparators 31 through 33, AND circuits 34, 36, counters 35, 37, delay circuit 38, subtractor 39, gate circuit 40, and multiplier 41.

Adder 30 adds present threshold $t_{k,k+1}$ and predetermined width $\Delta$.

Comparators 31, 32 compare two inputs a, b and output 1 when b<a. Input a of comparator 31 and input b of comparator 32 are supplied with quality information Si from quality measuring unit 4 where i represents a chronological packet number. Si represents the SIR value of an ith packet (hereinafter referred to as i packet). Input b of comparator 31 is supplied with present threshold $t_{k,k+1}$. Input a of comparator 32 is supplied with $t_{k,k+1}+\Delta$ from adder 30. Therefore, comparator 31 and comparator 32 give the condition $t_{k,k+1}<Si<t_{k,k+1}+\Delta$.

Comparator 33 compares two inputs a, b and outputs 1 when a=b. Input a of comparator 33 is supplied with MCSi which represents an MCS used for the i packet.

The inputs of AND circuit 34 are supplied with the outputs from comparators 31 through 33. AND circuit 34 outputs flag signal $R_{k,k+1,i}$ in the form of pulses representing a packet using MCS(k+1) which is received with the SIR value in area $t_{k,k+1}<Si<t_{k,k+1}+\Delta$ (counting area).

Flag signal $R_{k,k+1,i}$ is applied to counter 35 and AND circuit 36. The other input of AND circuit 36 is supplied with error flag Ei of the i packet. Error flag Ei is a flat indicting that the i packet has an error. The output of AND circuit 36 is supplied to counter 37.

Counter 35 counts a total number of packets using MCS (k+1) which are received with the SIR value in counting area $t_{k,k+1} < S_i < t_{k,k+1} + \Delta$, and outputs a Carry pulse when the counted number reaches a predetermined count value (hereinafter referred to as full count value).

Counter 37 counts packets with errors, among packets MCS(k+1) which are received with the SIR value in counting area $t_{k,k+1} < S_i < t_{k,k+1} + \Delta$. The value counted by counter 37 when the value counted by counter 35 reaches the full count value corresponds to an error rate.

The Carry pulse is delayed for a predetermined delay time, and then resets counter 37.

Subtractor 39 subtracts reference value $L_{k,k+1}$ from output $M_{k,k+1}$ of counter 37. Reference value $L_{k,k+1}$ is a value corresponding to the error rate (target error rate) in the vicinity of optimum threshold $T_{k,k+1}$.

When enabled by the Carry pulse, gate circuit 40 supplies the output from subtractor 39 to multiplier 41. Multiplier 41 multiplies the signal from gate circuit 40 by converging coefficient c. Adder 42 adds the output of multiplier 41 to present threshold $t_{k,k+1}$, and outputs the sum as new threshold $t'_{k,k+1}$. The Carry pulse also serves as a flag (threshold updating flag signal) $W_{k,k+1}$ indicating that threshold $t_{k,k+1}$ has been updated. New threshold $t'_{k,k+1}$ can be recognized in timed relation to threshold updating flag signal $W_{k,k+1}$.

The invention claimed is:

1. A data communication apparatus for adaptively selecting one of a plurality of modulation encoding processes for use in data communications, comprising:
    a quality measuring unit for measuring a line quality of data communications from a reception signal; and
    an adaptive modulation control unit for selecting one of the plurality of modulation encoding processes by comparing the line quality measured by said quality measuring unit with a threshold determined from a mutual relationship of characteristics of throughputs to the line quality according to the plurality of modulation encoding processes,
    wherein said threshold comprises a value of the line quality of two of said modulation encoding processes at a crossing of curves representative of said throughput characteristics under ideal conditions free of multipath and fading disturbances and containing white Gaussian noise only.

2. A data communication apparatus according to claim 1, wherein an initial value of said threshold comprises a value of the line quality of two of said modulation encoding processes at the crossing of curves representative of the throughput characteristics with respect to the line quality under ideal conditions free of multipath and fading disturbances and containing white Gaussian noise only.

3. A data communication apparatus according to claim 1, further comprising a rake combining unit for rake-combining said reception signal and supplying the rake-combined reception signal to said quality measuring unit.

4. A data communication apparatus according to claim 1, further comprising a multipath interference canceler for supplying the reception signal from which a multipath interference has been removed to said quality measuring unit.

5. A data communication apparatus according to claim 1, wherein said line quality comprises a signal power to interference power ratio.

6. A data communication apparatus for adaptively selecting one of a plurality of modulation encoding processes for use in data communications, comprising:
    a quality measuring unit for measuring a line quality of data communications from a reception signal; and
    an adaptive modulation control unit for selecting one of the plurality of modulation encoding processes by comparing the line quality measured by said quality measuring unit with a threshold determined from a mutual relationship of characteristics of throughputs to the line quality according to the plurality of modulation encoding processes,
    wherein said adaptive modulation control unit dynamically controls said threshold to converge a throughput of data in a predetermined quality width from said threshold, transmitted according to a modulation encoding process and which is higher than a present threshold to a maximum throughput according to a modulation encoding process which is lower than the present threshold.

7. A data communication apparatus according to claim 6, wherein said adaptive modulation control unit determines an error rate of data transmitted according to said higher modulation encoding process in said predetermined quality width from said present threshold, and dynamically controls said threshold to converge said error rate to a target error rate which is determined from the maximum throughputs of said higher and lower modulation encoding processes.

8. A data communication apparatus according to claim 7, wherein an initial value of said threshold comprises a value of the line quality of two of said modulation encoding processes at a crossing of curves representative of throughput characteristics with respect to the line quality under ideal conditions free of multipath and fading disturbances and containing white Gaussian noise only.

9. A data communication apparatus according to claim 7, further comprising a rake combining unit for rake-combining said reception signal and supplying the rake-combined reception signal to said quality measuring unit.

10. A data communication apparatus according to claim 7, further comprising a multipath interference canceler for supplying the reception signal from which a multipath interference has been removed to said quality measuring unit.

11. A data communication apparatus according to claim 7, wherein said line quality comprises a signal power to interference power ratio.

12. A data communication apparatus according to claim 7, wherein said adaptive modulation control unit comprises:
    an error rate calculating unit for determining an error rate of the data transmitted according to said higher modulation encoding process in said predetermined quality width from said present threshold;
    a threshold updating unit for controlling the threshold to converge said error rate determined by said error rate calculating unit to the target error rate which is determined from the maximum throughputs of said higher and lower modulation encoding processes; and
    a comparing unit for selecting either one of said modulation encoding processes according to said threshold controlled by said threshold updating unit.

13. A data communication apparatus according to claim 7, wherein said target error rate comprises a calculated value of the error rate according to said higher modulation encoding process at the crossing of curves representative of the characteristics of throughputs with respect to the line quality under ideal conditions free of multipath and fading disturbances and containing white Gaussian noise only, of the modulation encoding processes which are higher and lower than said threshold.

14. A data communication apparatus according to claim 7, wherein said adaptive modulation control unit determines a new threshold by adding a value produced by multiplying the difference between said error rate and said target error rate by a predetermined converging coefficient, to said present threshold.

15. A data communication apparatus according to claim 6, wherein said adaptive modulation control unit comprises:
   a threshold updating circuit for counting a number of packets transmitted according to said higher modulation encoding process and a number of error packets among the packets in said predetermined quality width from said present threshold, subtracting a predetermined target value from said number of error packets to calculate a difference, multiplying said difference by a predetermined converging coefficient when said number of packets reaches a predetermined full count value, and adding the product to said present threshold to produce a new threshold; and
   a comparing unit for selecting either one of the modulation encoding processes based on said threshold produced by said threshold updating circuit.

16. A data communication apparatus according to claim 15, wherein an initial value of said threshold comprises a value of the line quality of two of said modulation encoding processes at the crossing of curves representative of the characteristics of throughputs with respect to the line quality under ideal conditions free of multipath and fading disturbances and containing white Gaussian noise only.

17. A data communication apparatus according to claim 15, further comprising a rake combining unit for rake-combining said reception signal and supplying the rake-combined reception signal to said quality measuring unit.

18. A data communication apparatus according to claim 15, further comprising a multipath interference canceler for supplying the reception signal from which a multipath interference has been removed to said quality measuring unit.

19. A data communication apparatus according to claim 15, wherein said line quality comprises a signal power to interference power ratio.

20. A data communication apparatus according to claim 15, wherein said threshold updating circuit comprises:
   a first counter for counting the number of packets transmitted according to said modulation encoding process which is higher than said threshold in said predetermined quality width from said present threshold;
   a second counter for counting the number of error packets among the packets transmitted according to said modulation encoding process which is higher than said threshold in said predetermined quality width from said present threshold;
   a subtractor for subtracting said target value from an output of said second counter;
   a gate circuit for identifying an output value of said subtractor when said first counter reaches a predetermined full count value;
   a multiplier for multiplying the output value of said subtractor which is identified by said gate circuit, by said converging coefficient; and
   an adder for adding an output of said multiplier to said threshold to produce the new threshold.

21. A data communication apparatus according to claim 7, wherein said target value comprises a calculated value of two of said modulation encoding processes of the number of error packets according to said higher modulation encoding process at the crossing of curves representative of the characteristics of throughputs with respect to the line quality under ideal conditions free of multipath and fading disturbances and containing white Gaussian noise only.

22. A data communication apparatus according to claim 7, further comprising:
   a pseudo signal generating unit for generating a single resembling a desired value signal, and a noise generating unit for generating a noise resembling an interference component,
   wherein said signal generated by said pseudo signal generating unit and the noise generated by said noise generating unit are combined with each other and used instead of the reception signal to determine the characteristics of throughputs with respect to the line quality.

23. A data communication apparatus according to claim 15, further comprising:
   a pseudo signal generating unit for generating a single resembling a desired value signal, and a noise generating unit for generating a noise resembling an interference component,
   wherein said signal generated by said pseudo signal generating unit and the noise generated by said noise generating unit are combined with each other and used instead of the reception signal to determine the characteristics of throughputs with respect to the line quality.

24. A data communication apparatus according to claim 7, wherein if there is established an upper limit value for said error rate, said adaptive modulation control unit lowers said target error rate to one of said upper limit value and said lower limit value.

25. An adaptive modulation control method for adaptively selecting one of a plurality of modulation encoding processes in an adaptive modulation data communication apparatus for use in data communications, comprising:
   measuring the line quality of data communications from a reception signal;
   comparing the measured line quality with a threshold which is determined from mutual relationship of the characteristics of throughputs to the line qualities according to the modulation encoding processes; and
   selecting either one of the modulation encoding processes based on the compared results,
   wherein the value of the circuit line quality of two of said modulation encoding processes at a crossing of curves representative of said characteristics under ideal conditions free of multipath and fading disturbances and containing white Gaussian noise only.

26. An adaptive modulation control method for adaptively selecting one of a plurality of modulation encoding processes in an adaptive modulation data communication apparatus for use in data communications, comprising:
   measuring the line quality of data communications from a reception signal;
   comparing the measured line quality with a threshold which is determined from mutual relationship of the characteristics of throughputs to the line qualities according to the modulation encoding processes; and
   selecting either one of the modulation encoding processes based on the compared result,
   wherein said threshold is dynamically controlled to converge a throughput of data in a predetermined quality width from said threshold transmitted according to a modulation encoding process which is higher than a present threshold to a maximum throughput according to a modulation encoding process which is lower than the present threshold.

27. An adaptive modulation control method according to claim 26, wherein an error rate of data transmitted according to said higher modulation encoding process in said predetermined quality width from said present threshold is determined, and said threshold is dynamically controlled to converge said error rate to a target error rate which is determined from the maximum throughputs of said higher and lower modulation encoding processes.

* * * * *